United States Patent [19]
Komizo et al.

[11] Patent Number: 5,309,252
[45] Date of Patent: May 3, 1994

[54] DOCUMENT GENERATOR INCLUDING A PICKUP MEANS FOR DETECTING PICTURE INFORMATION AND CODE INFORMATION

[75] Inventors: Shigeo Komizo, Machida; Mikio Fujita, Yokohama, both of Japan

[73] Assignee: Matsushita Electric Industrial Co., Ltd., Osaka, Japan

[21] Appl. No.: 787,112

[22] Filed: Nov. 4, 1991

[30] Foreign Application Priority Data

Nov. 9, 1990 [JP] Japan ................................ 2-305130

[51] Int. Cl.⁵ ............................................. H04N 5/14
[52] U.S. Cl. ................................................... 358/445
[58] Field of Search ............................. 358/445–449, 358/453

[56] References Cited
U.S. PATENT DOCUMENTS 4,485,399 11/1984 Schulz et al. ...................... 358/445
4,748,515 5/1988 Van Daele et al. ................. 358/445
5,140,612 8/1992 Yoshikawa ......................... 358/445

OTHER PUBLICATIONS

McConnell et al. "Fax: Digital Facsimile Technology & Applications" Artech House ©1989.

*Primary Examiner*—Stephen Brinich
*Attorney, Agent, or Firm*—Stevens, Davis, Miller & Mosher

[57] ABSTRACT

Disclosed is a document generator which comprises a memory unit for storing a digital picture signal obtained by picking up an image of a surface of a distributed object in which code information such as an ID number peculiar to the distributed object is provided by a notation tool including a bar code, a code information reading unit for selectively reading code information from the picture signal, and a retry unit for code information reading.

4 Claims, 3 Drawing Sheets

DOCUMENT GENERATOR INCLUDING A PICKUP MEANS FOR DETECTING PICTURE INFORMATION AND CODE INFORMATION

BACKGROUND OF THE INVENTION

The present invention relates to a document generator for generating documents to clarify, delivery and receipt of distributed objects in a delivery service business and to improve the efficiency of acceptance, relay, conveyance and delivery of distributed objects, such as mail items, packets, or parcels.

FIG. 1 shows a conventional delivery certificate generator for registered mail. FIG. 2 shows a flow of documents in a registered mail delivery service using the delivery certificate generator.

In a registered mail delivery service, a delivery certificate is generated for the purpose of managing the delivery business. The delivery certificate is used for receiving the receipt sign (or seal) of a recipient when a registered mail item is delivered to the recipient. The delivery certificate is prepared in duplicate. One of the duplicate copies is used as a delivery certificate for receiving the receipt sign (or seal) from the recipient to certify the receipt of the mail. After receiving the receipt sign (or seal), that duplicate copy is returned to the post office and kept in custody therein. The other of the duplicate copies is reserved in the post office to confirm the delivery by collation with the delivery certificate returned after receiving the receipt sign (or seal) certifying the end of the delivery. The contents required to be written in the delivery certificate are the recipient address, the recipient name, the accepting office symbol, the acceptance number, the special consignment character, the generating date and time zone, the receipt sign (or seal) column, the character string "delivery certificate", etc.

A conventional example of a mail treater will be described hereunder with reference to FIGS. 1 and 2. In FIG. 1, the reference numeral 1 designates the mail treater having a copying function, 2 a copying table for mounting a mail item to be copied, 3 a display means for displaying information of the number, characters and the like required for treating the mail, 11 a controller section for setting the contents of information displayed by the display means 3 and for monitoring the contents of the information, 12 a copying means constituted by an electrostatic charge process, an exposure process, a development process and a fixing process, 13 light sources for illuminating the copying table 2 and the display surface of the display means 3 with brightness required for copying, and 14 a focusing lens. The operation of the conventional example of the mail treater will be described hereunder. In FIG. 1, necessary information, such as the generating date and the serial number, is set to the display means 3 by operating the control section 11. Then, the distributed object 4 is placed on the copying table 2, so that the distributed object 4 is irradiated with the light emitted from the light sources 13. As a result, a copied image of the distributed object 4 is focused on the image-forming surface 15 of the copying means 12 by the focusing lens 14, as well as on the display surface of the display means 3. The copied image is outputted as a hard copy after the development process and the fixing process. As described above, the copied image of the mail provided with necessary information such as the generating date and the serial number can be produced as a hard copy even in the conventional mail treater.

A conventional example of a registered mail delivery service using the above mail treater having a copying function will be described hereunder with reference to FIG. 2. In FIG. 2, the reference numeral 1 designates the mail treater having the copying function. The mail treater 1 includes two reduced scale optical systems. The copying table 2 and the display portion 3 are provided so as to be located on the document surface of the mail treater 1. The display portion 3 is located in the interior of the copying table 2 so that the contents of displayed information can be changed. The reference numeral 4 designates a registered mail item. When the registered mail item 4 is copied after it is set on the copying table 2 with its front surface turned up, two scale-reduced images relative to the surface of the mail and the contents of information displayed on the display portion 3 are produced as a delivery certificate 5 and a delivery certificate reserve 6. In each of the delivery certificate 5 and the delivery certificate reserve 6, not only the information such as the recipient address and name, the accepting office symbol, the acceptance number, and the special consignment character, is described as the image of the surface of the mail but also the information such as the generating date, time zone, the receipt sign (or seal) column, the character string "delivery certificate", the serial number, etc., is described as the image of information displayed on the display portion 3.

The delivery certificate 5 is stuck onto the registered mail 4 before the registered mail 4 is delivered to the recipient. The delivery certificate reserve 6 is reserved in the post office. The delivery certificate 5 is removed from the registered mail 4 when the registered mail 4 is delivered to the recipient 7. The delivery certificate 5 is returned to the post office after receiving the receipt sign (or seal) 8 from the recipient 7. The delivery certificate 5 thus returned is collated with the delivery certificate reserve 6 to confirm the completion of the delivery and then kept in a depository 9 after being classified by the date, the time zone and the delivery section number. When some user makes an inquiry at the time of occurrence of accidents, the depository 9 in the post office is searched for the target delivery certificate 5 with the receipt sign (or seal) 8 to give an answer to the user.

For a large user such as a governmental office or a large business office, the delivery certificate may be generated in a manner so that the information such as the recipient address and name, the generating data and time zone, etc. is described in a multiple entry type sheet in which the character string "delivery certificate" and the receipt sign (or seal) column are described in advance, and the information such as the accepting office symbol and the acceptance number for each of a plurality of mails is further described in the multiple entry type sheet.

In the conventional delivery certificate generator for registered mail, however, the scale of the copied image of the mail is reduced. Accordingly, there arises a problem that the characters mechanically printed by a printer or the like are so small that the delivery certificate cannot be read easily. If the scale reducing rate is decreased to solve this problem, there arises another problem that the size of the delivery certificate becomes so large that not only the running cost becomes high but also the handling efficiency at the time of the sticking or keeping of the delivery certificate becomes poor. Further, many hands are required for searching for a delivery certificate in response to an inquiry about accidents from a user or for confirmation of the completion of the delivery. Consequently, speedy response to such an inquiry is impossible.

SUMMARY OF THE INVENTION

An object of the present invention is to solve the above mentioned problems in the conventional art.

Another object of the invention is to provide an excellent document generator in which the character size of the delivery certificate can be changed freely to be read easily, the treating condition of a mail can be automatically searched for, and information therefor can be inputted mechanically.

To achieve the foregoing objects, the invention provides a document generator comprising: a memory means for storing a digital picture signal obtained by picking up an image of a surface of a distributed object in which code information such as an ID number peculiar to the distributed object is provided by notation means such as a bar code, code information reading means for selectively reading code information from the picture signal, and retry means for code information reading.

The present invention having such a configuration as described above has the following meritorious effects.

Because the image of the surface of the distributed object is obtained as a digital picture so that the scale reducing rate is set by a digital process, the scale reducing rate can be selected instantly without the necessity of movement in the optical system as in the conventional art.

Because the image-pickup means and the code information reading means are provided, picture information on the surface of the distributed object and code information can be treated incorporatedly. Accordingly, a man-machine interface excellent in data filing or data searching can be provided between an information system and a man.

Because the code information reading means is provided with the retry means for code information reading, the invention can be applied to the case where code information is hard to be read though the object is suitable for the image-pickup process. Even in such a case, the contents of code information can be read by retrying the image-pickup operation while holding the picture signal, and by searching the newly picked-up picture signal for code information.

DESCRIPTION OF THE PREFERRED EMBODIMENT

Figure 1:
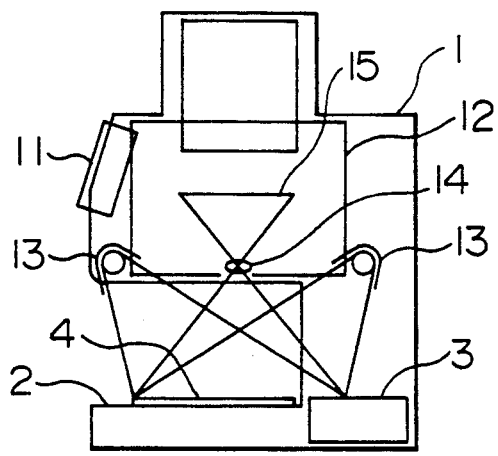
FIG. 1 is a view showing the structure of a conventional mail treater.
Figure 2:
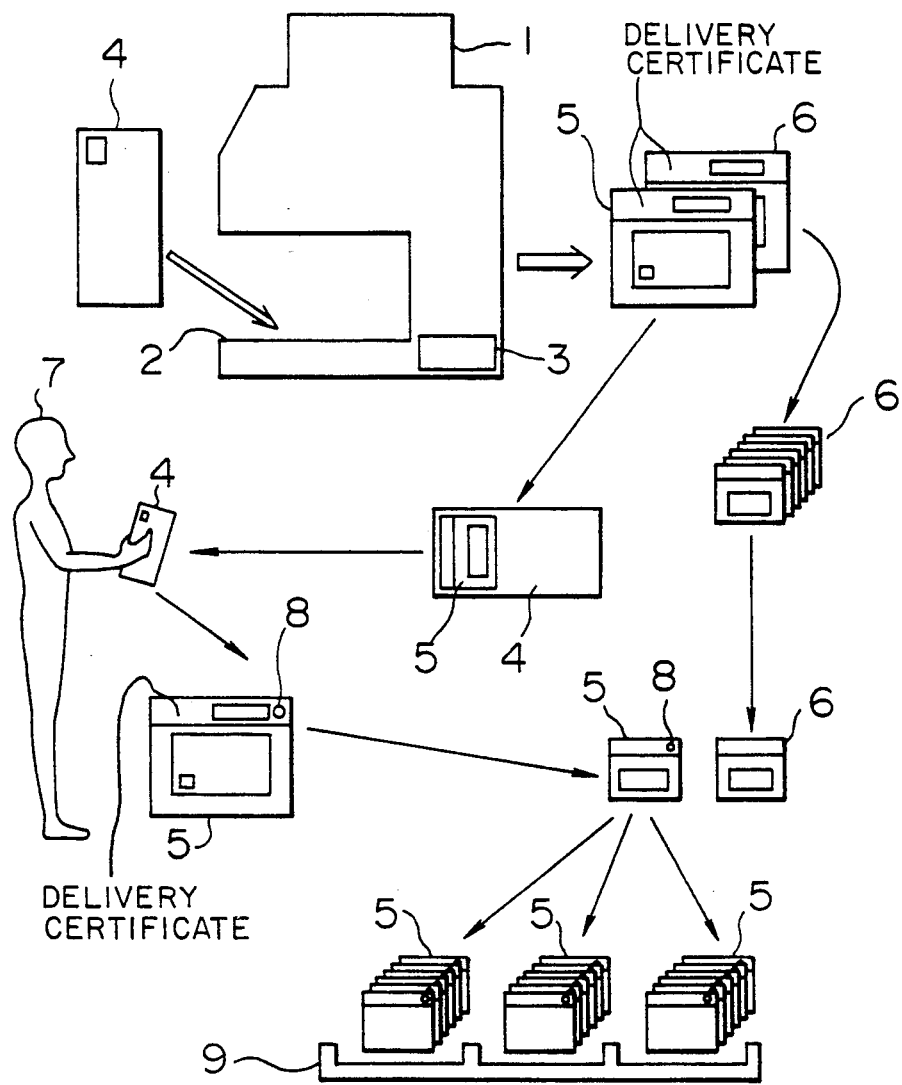
FIG. 2 is a view showing a flow of documents in a registered mail delivery business using the conventional mail treater.
Figure 3A:
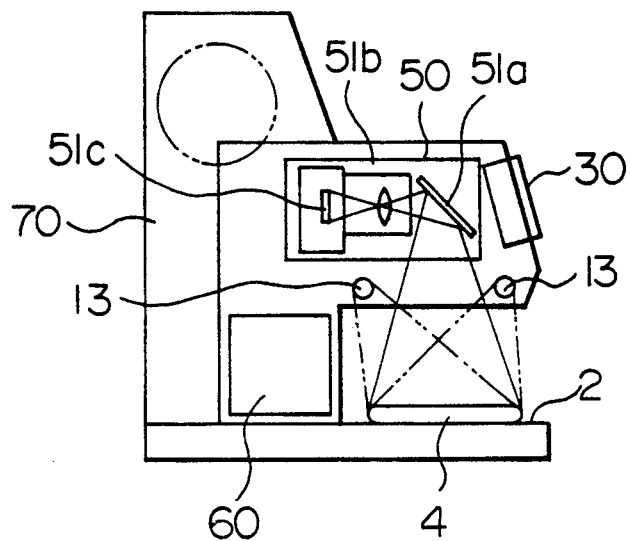
FIG. 3A is a side view showing the mechanical construction of a document generator as an embodiment of the present invention.
Figure 3B:
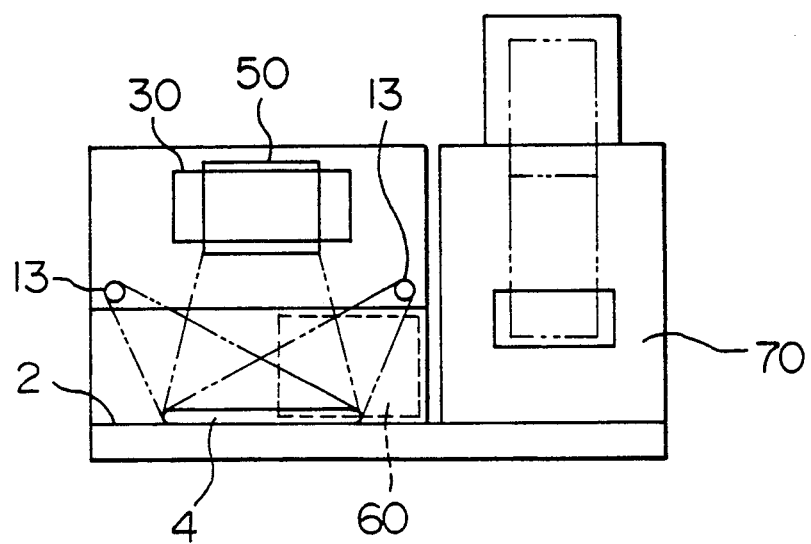
FIG. 3B is a front view showing the mechanical construction of the document generator of the same embodiment.
Figure 4:
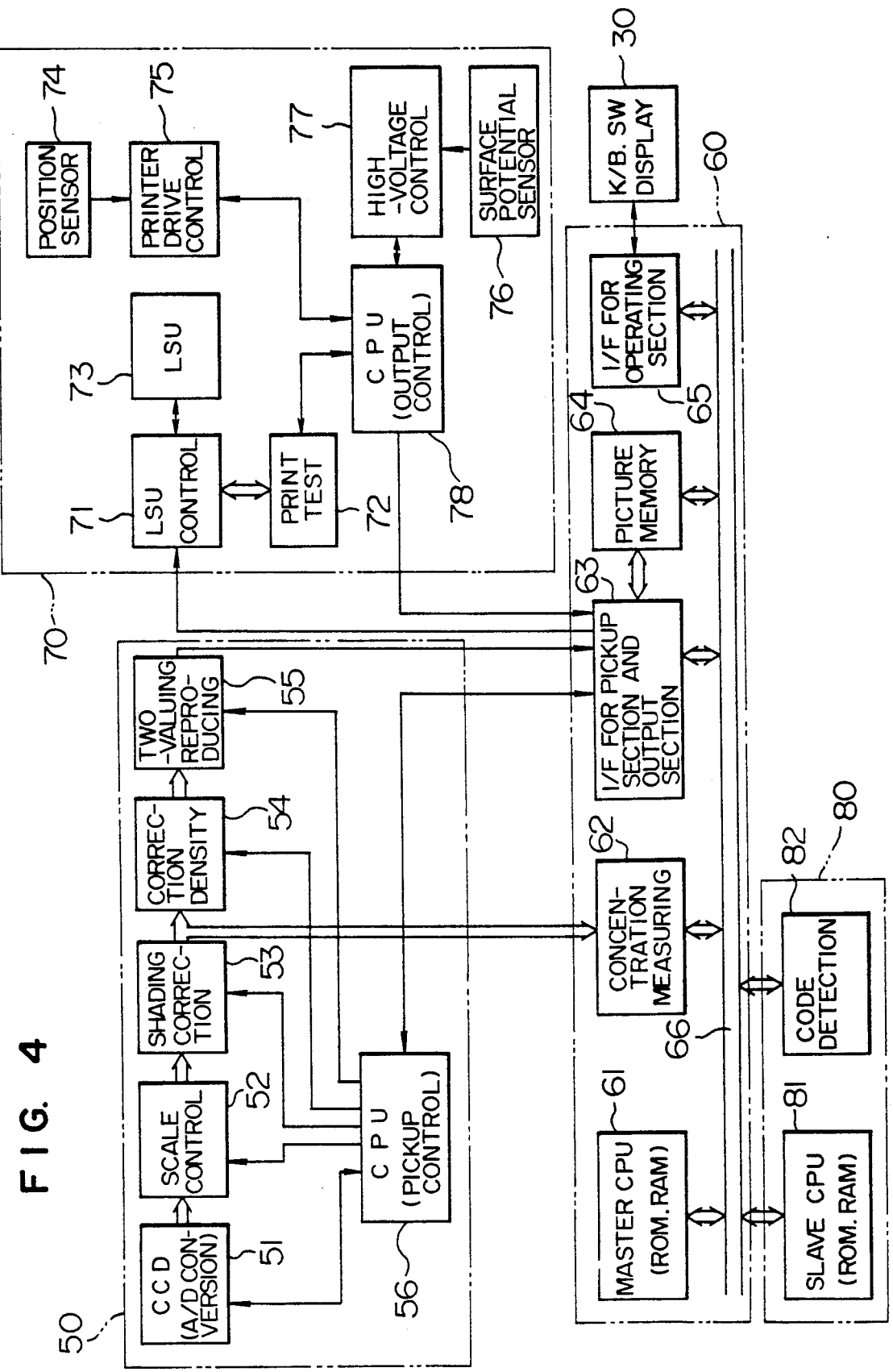
FIG. 4 is a block diagram showing the electrical system of the document generator of the same embodiment.

FIGS. 3A and 3B are a side view and a front view showing the mechanical construction of a document generator as an embodiment of the present invention. FIG. 4 is a block diagram showing the electrical system of the document generator of the same embodiment of the invention. In FIGS. 3A and 3B, the reference numeral 2 designates a copying table for mounting thereon a distributed object 4 to be copied, 30 an operating section for setting the information required for treating the distributed object and for monitoring the contents thereof, 13 light sources for illuminating the copying table 2 with brightness required for copying, and 50 an image-pickup section located above the copying table 2. The reference numeral 60 designates a controller section for performing total control of the document generator, for digitizing of a picture signal and for temporary storage, and 70 a printer section for outputting a copied image of the distributed object, necessary delivery management information and read-out code information in hard copy.

Code information such as the ID number peculiar to the distributed object is provided on a surface of the distributed object 4, such as a packet, a mail item, a parcel, or the like, by a notation means such as a bar code. The image-pickup section 50 has a reflection mirror 51a for reflecting light incident thereon from the distributed object 4 as a subject, a focusing lens 51b for focusing the light reflected by the reflection mirror 51a to form an image, and an image-pickup device 51c such as a CCD for picking up the image of the distributed object 4 formed by the focusing lens 51b.

FIG. 4 is a block diagram of the electrical system.

In FIG. 4, the reference numeral 30 designates an operating section which is constituted by a display, a keyboard, and switches. The reference numeral 50 designates an image-pickup section which is constituted by a CCD camera portion 51, a scale control circuit 52, a shading correction circuit 53, a density correction circuit 54, a pseudo halftone two-valuing reproduction circuit 55, and an image-pickup section control CPU 56 for controlling those parts mentioned above. The reference numeral 60 designates a controller section which is constituted by a master CPU 61, a picture density measuring circuit 62, an image-pickup/output interface circuit 65, and a bus line 66 for connecting these parts. The reference numeral 70 designates a printer section which is constituted by a laser scanner unit synchronizing control circuit 71, a print testing circuit 72, a laser scanner unit 73 having a polygon motor driving circuit and a laser oscillation circuit, various types of position sensors 74, a printer section driving control circuit 75, a surface potential sensor 76, a high-voltage control circuit 77 used for electrostatic charge, development and transfer, and an output control CPU 78 for controlling these parts. The reference numeral 80 designates a code information reader section which is constituted by a slave CPU 81 and a code information position detecting circuit 82.

The operation of the aforementioned embodiment will be described hereunder. In the aforementioned embodiment, the delivery management information, such as the generating date and the reference number, is set to the display by manipulating the operation keyboard of the operating section 30. The delivery management information thus set is fed to the RAM of the master CPU 61 through the operating section interface circuit 65 and stored in the RAM. Then, the distributed object 4 is placed on the copying table 2, so that the distributed object 4 is irradiated with the light emitted from the light sources 13. As a result, a copied image of the distributed object 4 is focused on the image-pickup device 51c by the focusing lens 51b through the reflection mirror 51a of the CCD camera portion 51. Then, the image-pickup device 51c controlled by the image-pickup section control CPU 56 successively converts optical energy into electric energy and further converts an analog quantity into an digital quantity in an A/D conversion circuit to send out the image-pickup data to the following circuits. The image-pickup data thus sent out is subjected to scale control, shading correction, picture density correction and pseudo halftone two-valuing reproduction by a pipe-line process using the scale control circuit 52, the shading correction circuit 53, the density correction circuit 54 and the pseudo halftone two-valuing reproduction circuit 55. Before the density correction, the image-pickup data subjected to the shading correction is fed to the image density measuring circuit 62 of the controller section 60 to judge the density level of the distributed object as a subject of image pickup. The density correction of the image-pickup data is performed on the basis of the judgment. The image-pickup data two-valued by the two-valuing reproduction circuit 55 is fed to the controller section 60 through the image-pickup/output interface circuit 63 and stored in the picture memory 64. The code information reader section 80 is connected to the bus line 66 of the controller section 60. Code information is extracted from the image-pickup data by the code information position detecting circuit 82 to decode the contents of the code information. The slave CPU 81 of the code information reader section 80 is exclusively used for the code information reading. The code information thus read, together with the copied image of the distributed object 4 and the delivery management information, is stored in the picture memory 64 according to a predetermined format. When the reading of code information ends in failure, the failure is indicated so that an image-pickup command for a retry is waited for while the image-pickup data is held on the picture memory 64. When the start switch of the operating section 30 is pushed down in this condition, the image-pickup section retries to pick up an image of the distributed object, to obtain the image-pickup data in the next page of the picture memory 64, to extract code information from the image-pickup data, and to perform the reading operation. When the reading of code information by the retry ends in success, the previous image-pickup data held in the picture memory 64 and the code information read by the retry are stored in the picture memory 64. Not only the retry may be repeated till the reading results in success but also the reading may be interrupted to output only the copied image.

When the reading of code information ends in success, the controller section 60 issues an instruction to output a delivery certificate, so that the contents of the picture memory 64 are fed to the printer section 70 through the image-pickup/output interface 63. The contents of the picture memory 64 given to the printer section 70 are written in a photosensitive material by modulating laser light from the laser scanner unit 73 while controlled by the laser scanner unit synchronizing control circuit 71, so that a document is outputted as a hard copy. The printer section 70 is constituted by a so-called indirect electrophotographic technique. Accordingly, a hard copy is produced by the respective processes of electrostatic charge, exposure, development, transfer, separation, electrostatic discharge, cleaning and fixing. In the printer section 70, not only picture forming control is performed by the surface potential sensor 76 for detecting the charged potential of the photosensitive material and the high-voltage control circuit 77 for controlling the voltage applied to the electrostatic charger and the development bias voltage, but also paper drive control is performed by the position sensor 74 for detecting the paper position and the driving control circuit 75. The print testing circuit 72 serves to test printing at the time of the adjustment of the respective devices.

As described above, in the above embodiment, not only an image picked up from a distributed object is outputted but also code information is automatically extracted from the picked-up image data. Accordingly, a form constituted by a copied image of a surface of the distributed object as a hard copy, the necessary information for the document, such as the generating date, the reference section number, the serial number, etc., and the code information extracted from the image data can be obtained.

When code information cannot be automatically extracted from the picked-up image data in the above process, the image-pickup operation to read code information can be retried while the image data is held. Accordingly, a retry to read the code information from the image data thus held can be made. Accordingly, a document can be produced efficiently even when the image data suitable as a copied image of the distributed object discords with the image data suitable for reading the code information.

As is obvious from the above embodiment, the present invention, in which not only an image of a surface of a distributed object picked up as digital image data is stored in the picture memory but also code information for indicating information peculiar to the distributed object can be extracted from the picked-up image data, has the advantage that a hard copy provided by adding necessary information for a document such as the generating date, the time zone, the reference section number, the serial number, etc., and the thus read code information to the copied image of the surface of the distributed object can be obtained as a document for treating the distributed object. When the automatic extraction of the code information from the picked-up image data ends in failure in the above process, the image-pickup operation to read the code information can be retried while the image data is held. Accordingly, the invention has the advantage that a retry to read the code information from the image data can be made. Further, the image-pickup data for the retry can be held on a different area of the picture memory. Accordingly, a document constituted by the image of the surface of the distributed object and the code information attendant thereto can be produced efficiently even when the image data suitable as a copied image of the distributed object discords with the image data suitable for reading the code information.

What is claimed is:
1. A document generator comprising:
   image-pickup means for picking up an image of a surface of a distributed object;

signal conversion means for converting a picture signal obtained by said image-pickup means into a digital signal;

memory means for temporarily storing the picture signal digitized by said signal conversion means;

code detecting means for detecting an area of code information in said picture signal;

code interpreting means for interpreting said code information; and retry means for (i) retrying picking up an image of said distributed object, (ii) detecting an area of code information in a newly picked-up picture signal, and (iii) interpreting said code information of said newly picked up picture signal after storing the former picture signal, in the event the interpreting of said code information ends in failure.

2. A document generator comprising:

memory means for storing a digital picture signal obtained by picking up an image of a surface of a distributed object in which distributed object management information including an ID number peculiar to said distributed object is provided by notation means including a bar code;

code information reading means for selectively reading code information from said picture signal; and retry means for code information reading, whereby a scale reducing rate for said image of said surface of said distributed object picked up as a digital picture is set instantly by digital treatment without movement of an optical system.

3. A document generator comprising:

memory means for storing a digital picture signal obtained by picking up an image of a surface of a distributed object in which distributed object management including information an ID number peculiar to said distributed object is provided by notation means including a bar code;

code information reading means for selectively reading code information from said picture signal; and retry means for code information reading, whereby picture information and code information on said surface of said distributed object are treated by image-pickup means and said code information reading means.

4. A document generator comprising:

memory means for storing a digital picture signal obtained by picking up an image of a surface of a distributed object in which distributed object management including information an ID number peculiar to said distributed object is provided by notation means including a bar code;

code information reading means for selectively reading code information from said picture signal; and retry means for retrying code information reading, whereby when the reading of the code information ends in failure even if the object to be picked up is suitable for picking up, after the picture signal is held, an image of said distributed object is picked up again, a newly picked-up picture signal is searched for code information, and the contents of the code information is read.

* * * * *